Dec. 12, 1967 R. HELL ET AL 3,358,123

DEVICE FOR TRANSFORMING THE HOLE COMBINATIONS OF A PERFORATED MASTER TAPE INTO CORRESPONDING COMBINATIONS OF CONTACT POTENTIALS IN DEVICES USED FOR CIPHER EXTENSION

Filed Jan. 11, 1962 2 Sheets-Sheet 1

Dec. 12, 1967 R. HELL ET AL 3,358,123

DEVICE FOR TRANSFORMING THE HOLE COMBINATIONS OF A PERFORATED MASTER TAPE INTO CORRESPONDING COMBINATIONS OF CONTACT POTENTIALS IN DEVICES USED FOR CIPHER EXTENSION

Filed Jan. 11, 1962 2 Sheets-Sheet 2

United States Patent Office 3,358,123

Patented Dec. 12, 1967

3,358,123

DEVICE FOR TRANSFORMING THE HOLE COMBINATIONS OF A PERFORATED MASTER TAPE INTO CORRESPONDING COMBINATIONS OF CONTACT POTENTIALS IN DEVICES USED FOR CIPHER EXTENSION

Rudolf Hell, Kiel, and Roman Koll, Kiel-Wellingdorf, Germany, assignors to Dr.-Ing Rudolf Hell Kommanditgesellschaft, Kiel-Dietrichsdorf, Germany, a company of Germany Filed Jan. 11, 1962, Ser. No. 166,461
Claims priority, application Germany, Mar. 30, 1961, H 37,683
6 Claims. (Cl. 235—61.11)

Figure 1:
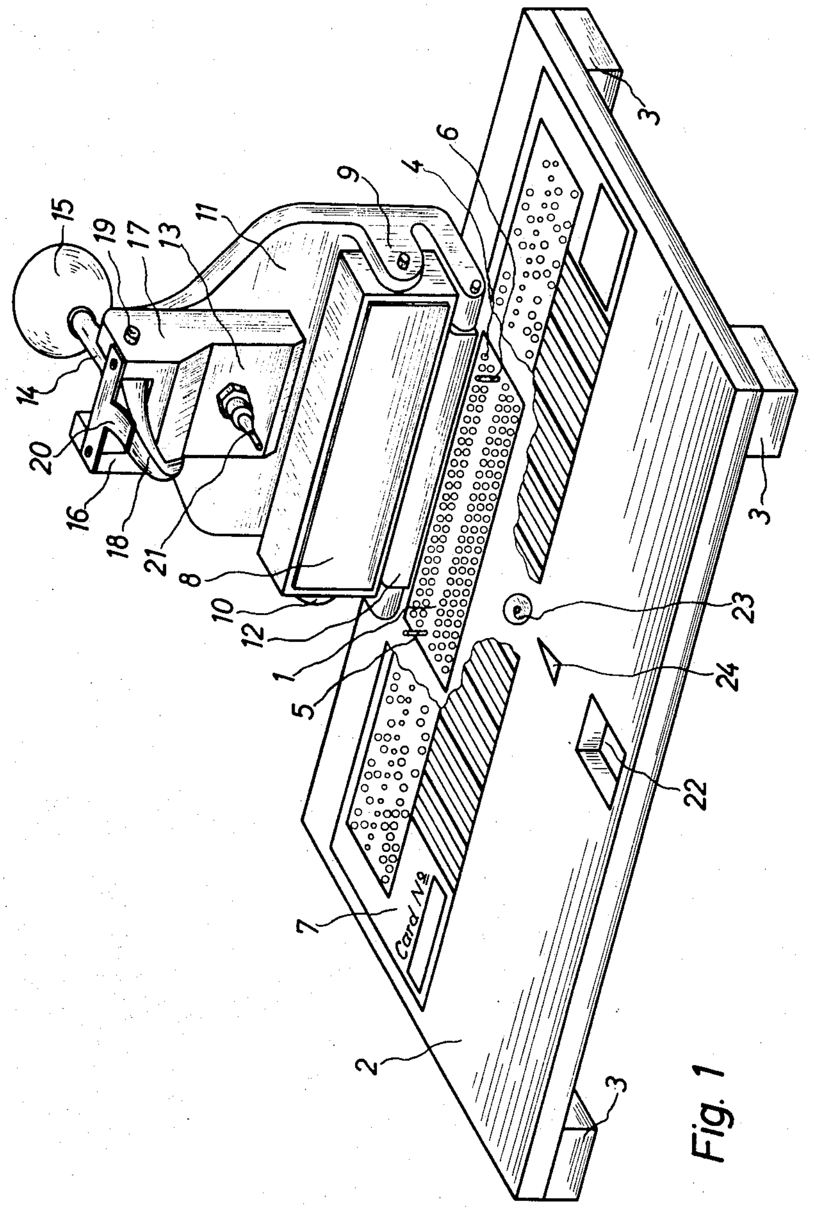

The invention relates to a device for transforming the hole combinations of a perforated master ciphering tape into corresponding combinations of contact potentials, in devices used for cipher extension.

In many ciphering machines the cipher for ciphering a message is taken from the hole combination of an aperiodical perforated ciphering tape which contains a meaningful or senseless cipher text in binarily coded form. In order to save perforated tape material and to avoid the (secret) dispatch of thick rolls of perforated tapes, a comparatively short, unperiodical, perforated master tape with up to about 100 hole combinations is often used. A periodical sequence of pulse combinations is gained from the perforated master tape by certain scanning and extending processes. The period of such a sequence is, when compared with the number of hole combinations of the perforated master tape, very great and so great that it cannot be acknowledged by unauthorised personnel.

In applicants' copending patent application Ser. No. 798,293, filed Mar. 9, 1959, now Patent No. 3,034,105 several devices are described which permit the transformation of the hole combinations of a perforated master tape into corresponding combinations of two contact potentials. This transformation or programming is indispensable for obtaining a cipher extension, since the perforated master tape itself cannot be used immediately therefor.

The transforming or programming devices described in the mentioned patent application, are somewhat complicated and expensive, so that a simplification and cheapening appears desirable.

The transforming device according to the invention comprises a contact field the contact pins of which are embedded into insulating material and arranged as the holes of a fully perforated tape section, a block made of elastic organic material of the same length and width of said contact field, a perforated cipher card inserted between said contact field and said block, means for fixing said card in defined, eligible, displaced positions in register with and relative to said contact field, a clamping device by which said perforated cipher card is clamped between said contact field and said block, and a marking device which, upon clamping said card between said block and said contact field, marks forcibly the selected positions of said perforated cipher card on said card.

The individual contact rows arranged in parallel with the length dimension of the contact field, are cyclically scanned by a corresponding number (5 in the case of the five-element teleprinter code) of electronic ring counters according to any program. The ring counters have counting periods no two of which have a common divisor, the period numbers lying closely together and in the neighbourhood of the number of contact columns (arranged transversely to the contact field) of the contact field. The electronic periodical scanning of the two potentials of the contact pins of the contact rows results in a sequence of permanently changing pulse combinations with a very great period. This period is equal to the product of the aliquant counting periods of the individual ring counters.

Since, in the present case, the length of the perforated tape section contained in the card, is to be a multiple of the length of the contact field, the card can be used many times by displacing it each time one hole combination or several hole combinations when putting it on the contact field, however, in such a way, that positions of the card already used, are not used once more. The displacement may be obviously performed so many times as the difference between the number of hole combinations of the perforated cipher card and the number of contact columns amounts to.

The perforated cipher card according to the invention comprises a thin, longish, rectangular card made of stiff, flexible material and partly representing a perforated tape section being arranged in parallel with the length sides of said card, at least one marking trace being arranged in parallel with the length sides of said card, said marking trace(s) permitting to fix said card in positions in register with and relative to said contact field, and reference lines running transversely to said perforated tape section, said reference lines being coordinated to the hole combinations of said perforated tape section and being successively denoted and marked by said marking device of said clamping device for indicating the card's positions already used.

According to another object of the invention, the perforated cipher card is made of electrically conductive metal. If the metallic card is inserted into the clamping device, those contact pins of the contact field which make contact with the card, have the potential of the card, while the other contact pins of the contact field, which, by the presence of holes in the card, don't make contact with the card, are given another potential. Thus, the two binary elements—hole and non-hole—of the perforated tape section are transformed into two different electrical potentials.

According to another object of the invention, the perforated cipher card is characterised in that it is made of organic non-conductive material, that a thin, perforated metal foil is provided having the same hole combinations as has said perforated tape section, said foil being applied to the bottom surface of said card in such a way that the hole combinations of said foil are in register with the corresponding hole combinations of said perforated tape section, so that, upon inserting said card into said clamping device, said perforated metal foil makes electrical contact with the contact pins of said contact field. The effect of this measure is the same as occurs when using a metallic card.

According to another object of the invention, the perforated cipher card is characterised in that it is likewise made of organic non-conductive material, that a thin, not perforated metal foil, except for the transporting hole trace, is provided being applied to the top surface of said card, so that, upon inserting said card into said clamping device and closing it, said metal foil touches said clamping block.

Upon closing the clamping device, the elastic material of the clamping block presses the deformable foil material a little through the holes of the tape section so that the foil makes electrical contact with those contact pins of the contact field which lie below such holes. These contact pins have the potential of the foil, while the remaining contact pins insulated from the foil by the intermediate tape material, are given another potential.

Figures 2, 3, 4, 5, 6:
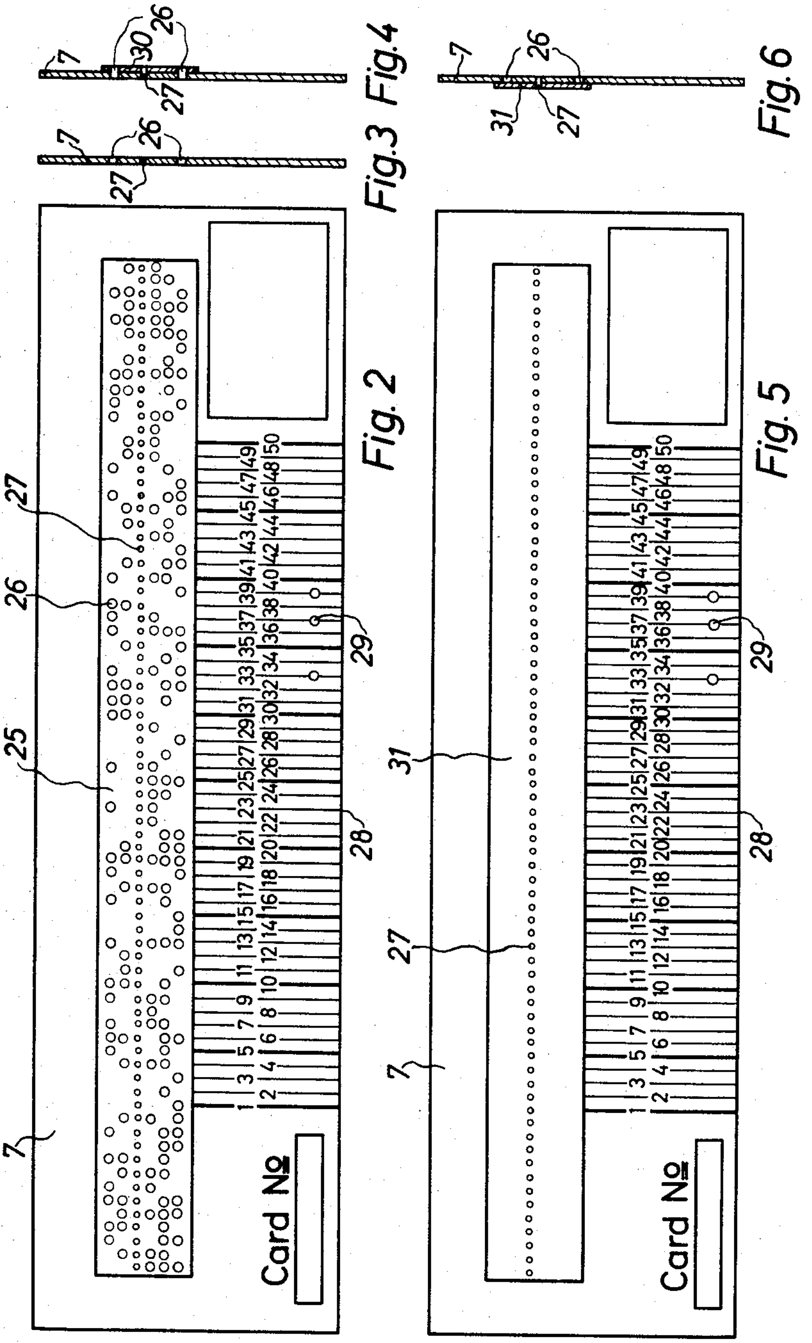

For a better understanding of the nature and objects of the invention, reference should be had to the following detailed description taken in connection with the accompanying drawings, in which:

FIG. 1 shows the clamping device with the contact field and the marking device in perspective view, FIGS. 2 and 5 respectively show a perforated cipher card in top view, FIGS. 3, 4, and 6 respectively show a section through one of the hole combinations of the cipher card.

In FIG. 1, the contact field 1 is lowered in the base plate 2 supported by four feet 3. The contact field consists of five rows of 25 small round contact pins 4, arranged as the holes of a fully perforated tape of the five-element teleprinter code. The contact pins are embedded into insulating material and project about 0.01 inch above the plane of the insulating material. The lower ends of the contact pins are tagged (not visible) in order to connect the electronic circuit of the ring counters to the contact pins. Two short pins 5 and 6 are attached at the ends of the contact field between the second and third contact row, that is, at those places where the first and the last hole of the transporting hole trace of a corresponding perforated tape section is located. These pins serve to fix the perforated cipher card 7 in certain displaced positions in register with and relative to the contact field 1. The pins 5 and 6 can be sunk into the base plate 2 by two springs (not visible) being compressed and built in the base plate 2.

The clamping block 8 made of elastic organic material, e.g. of rubber, is pivoted with friction in the projections 9 and 10 of the clamping plate 11. The latter is pivoted in the block 12 mounted on the base plate 2. A fork-shaped block 13 is attached to the bottom surface of the clamping plate 11. The lever 14 with the ball-shaped handle 15 is pivoted in the projections 16 and 17 of the block 13. The locking hook 18 is eccentrically pivoted in the lever 14 (not visible) with respect to its shaft 19, and is under depression of the flat spring 20. A punching pin 21 is attached to the block 13 below the hook 18.

Upon closing the clamping device, the block 8 presses the pins 5 and 6 into the insulating material of the contact field 1, and the hook 18 engages the slot 22 of the base plate 2. The lever 14 is pulled downwards into its horizontal position for locking the clamping device.

Upon closing the clamping device, the punching pin 21 perforates one of the reference lines of the perforated cipher card 7 by engaging the hole 23 located in front of the middle of the contact field 1 in the base plate 2. This marking device serves for fool-proof marking the card's positions already used. The mark 24 located in front of the hole 23, serves for reading and setting the desired positions of the perforated cipher card 7.

In FIG. 2, the thin, longish, rectangular, perforated cipher card 7 is made of stiff, flexible material and has a size of about 2.36 x 8.25 ins. It contains in its upper half the perforated master tape section 25, in which about 75 chance distributed hole combinations 26 are punched. The card is inserted into the clamping device with the aid of the two pins 5 and 6 (FIG. 1) which engage two holes of the transporting hole trace 27. On the lower half of the card, a reference line system is printed the lines 28 of which running vertically to the perforated tape section 25 and being in alignment with the hole combinations 26 of the middle part of the perforated tape section 25. The lines 28 are successively numbered from 1 til 50 and allow, with the aid of the mark 24 (FIG. 1), to read and to set 50 displacements of the cipher card 7, supposed that the contact field 1 (FIG. 1) on which the cipher card is put, contains 25 contact columns. The read number indicates a certain partial section of the tape section 25, the partial section extending twelve hole combinations each to the left and right hand side of the mark 24. The middle and 25th hole combination faces the mark 24.

Upon closing the clamping device, a hole 29 is punched in that line which was set to the mark 24 (FIG. 1) in order to indicate what positions of the perforated cipher card have already been used, since one position must not be used twice. After the card has been used 50 times, the card is exhausted and has to be replaced by a new one.

The perforated cipher card may consist of electrically conductive not too hard metal, e.g. of copper, brass or the like. When putting it on and in register with the contact field 1 (FIG. 1) of the clamping device, those contact pins of the contact field not facing holes of the card, have the potential of the card, while those contact pins facing holes, are given another potential. Thereby the transformation of the hole combinations into corresponding potential combinations is achieved.

FIG. 3 shows a section through one of the hole combinations of the card.

Another embodiment represented in FIGS. 2 and 4, consists in applying a thin metal foil 30, e.g. of gold, to the bottom surface of a perforated cipher card made of non-conductive organic material, e.g. of bristol board or plastics. The foil has the same hole combinations as has the perforated cipher card and is applied in such a way to the card that the hole combinations of the foil are in register with the corresponding hole combinations of the card.

The effect of this embodiment of the card is the same as occurs when using a metallic card.

A further embodiment is shown in FIGS. 5 and 6. In this case, the card is likewise made of organic non-conductive material, however, the metal foil 31 is no longer provided with hole combinations, but only with the transporting hole trace 27 and is applied to the top surface of the card. When inserting the card into the clamping device and closing it, the elastic material of the clamping block 8 (FIG. 1) presses the deformable foil a little through the holes of the hole combinations of the perforated tape section, so that the foil makes electrical contact with those contact pins of the contact field (FIG. 1) which lie below such holes. These contact pins have the potential of the foil, while the remaining contact pins insulated from the foil by the intermediate tape material, are given another potential.

If, in the two embodiments of the card at last described, the metal foil is given the same potential, the configuration of contact potentials in the one case is, so to say, the "negative" of the configuration of potentials in the other case.

It is to be understood that the invention is not limited to the particular devices herein described and illustrated, since various modifications which may occur to those skilled in the art, fall within the spirit and scope of the invention as set forth in the following claims.

What we claim is:

1. A device for use in cipher extension, in which the hole combinations of a perforated master tape, carried by a cooperable cipher card are transformed into corresponding combinations of contact potential, comprising a base member carrying a contact field having a plurality of contacts insulated with respect to one another, a card-engaging member movable relative to said base member and cooperable therewith for maintaining such a cipher card disposed therebetween in any one of a plurality of defined positions eligible of registry with respect to the contacts of said field, whereby different combinations of contacts may be actuated in different positions of displacement of such a card, as determined by the hole combinations of such card disposed within said contact field, means for releasably retaining said card-engaging member in card-retaining position, and marking means carried by at least one of said members for forcibly producing on said card a mark identifying the engaged operative position of such card and thus the hole combinations therein with respect to said contact field, said marking means being arranged for acuation by relative movement of said members to card-retaining position.

2. A device according to claim 1, wherein said card-engaging member is provided wtih a block of resilient material forming the card-engaging portion of such member, operative to apply yieldable pressure on an engaged card.

3. A device according to claim 2, wherein the contacts of said field are rigidly supported by said base member and arranged to normally extend at least partially into corresponding holes positioned in such a card.

4. A device according to claim 3, wherein the contacts of said field are arranged for engagement with a metallic surface on such a card, the contact combinations engaging such surface being determined by the hole combinations in such card.

5. A device according to claim 3, wherein said contacts are arranged to contact such a metal surface of the card except where such contacts are in alignment with corresponding holes in such a card.

6. A device according to claim 4, wherein said contacts are arranged to contact such a metal surface of the card only where there is a corresponding hole in such card.

References Cited

UNITED STATES PATENTS

| | | | |
|---|---|---|---|
| 2,848,163 | 8/1958 | Servell | 235—61.12 |
| 2,890,828 | 6/1959 | Stark et al. | 235—61.11 |
| 3,037,695 | 6/1962 | Dickinson | 235—61.12 |
| 3,043,504 | 7/1962 | Rabenda | 235—61.11 |

DARYL W. COOK, *Acting Primary Examiner.*

MALCOLM A. MORRISON, MAYNARD R. WILBUR, *Assistant Examiners.*

D. J. HIRSCHOP, R. E. COUNCIL, *Examiners.*